United States Patent [19]

Rosenkranz et al.

[11] 3,865,912
[45] Feb. 11, 1975

[54] METHOD FOR CONTROLLING WALL THICKNESS DURING A BLOW-MOULDING OPERATION

[76] Inventors: Otto Rosenkranz, 2 Jesselallee 21e, Hamburg 73; Peter Rose, 2359 Bussardweg 10, Henstedt-Ulzburg 4; Heinz Goos, 2 Dorotheenstr. 115, Hamburg 39, all of Germany

[22] Filed: Sept. 21, 1972

[21] Appl. No.: 291,022

[30] Foreign Application Priority Data
Oct. 13, 1971 Germany.............................. 2151067

[52] U.S. Cl......................... 264/25, 264/40, 264/94, 264/327, 425/143, 425/174.4, 425/DIG. 208, 425/DIG. 231
[51] Int. Cl............................................. B29c 17/07
[58] Field of Search.............. 264/25, 40, 89, 94, 96, 264/97, 98, 99, 327; 425/143, 174.4, DIG. 208, DIG. 231; 338/18

[56] References Cited
UNITED STATES PATENTS

| | | | |
|---|---|---|---|
| 2,924,695 | 2/1960 | Atkeson | 219/354 X |
| 2,983,888 | 5/1961 | Wormser | 338/18 |
| 3,186,034 | 6/1965 | Taylor, Jr. | 425/143 |
| 3,202,818 | 8/1965 | Thomiszer | 338/18 X |
| 3,423,572 | 1/1969 | Pansing | 219/358 UX |
| 3,646,188 | 2/1972 | Campbell | 264/40 X |
| 3,698,844 | 10/1972 | Grimm | 264/40 X |
| 3,775,524 | 11/1973 | Seefluth | 264/97 |

FOREIGN PATENTS OR APPLICATIONS 1,816,489   8/1970   Germany ............................. 264/94

*Primary Examiner*—Jan H. Silbaugh
*Attorney, Agent, or Firm*—Frank R. Thienpont

[57] ABSTRACT

A blow-moulding method employs a heating chamber for receiving a thermoplastic slug with a plurality of infra-red radiators in the chamber arranged to heat different portions of the slug to different temperatures. The radiation intensity of each radiator is measured by a bolometer and any deviation of the measured intensity from a predetermined intensity results in regulation of the power supply to the radiator.

1 Claim, 2 Drawing Figures

METHOD FOR CONTROLLING WALL THICKNESS DURING A BLOW-MOULDING OPERATION

BACKGROUND OF THE INVENTION

1. Field of the Invention

This invention relates to a method of controlling wall-thickness when blow-moulding hollow bodies of thermoplastic synthetic materials from moulded slugs of uniform wall thickness, different portions of the slugs being heated by several infrared radiators to different temperatures appropriate to the blow-moulding process.

2. Description of the Prior Art

In the manufacture of hollow bodies from thermoplastic materials, e.g. of plastic bottles, moulded slugs of uniform wall thickness are heated to the requisite temperature for the blow-moulding operation, then placed in the hot state in a blow-moulding die, and ultimately expanded to the desired form, by the introduction of compressed air. During the blow-moulding operation, optimum usage of material can be achieved by regulating the wall thickness. If, for example, bottles are to be blow-moulded from cylindrical moulded slugs of uniform wall-thickness, then the portions of the bottle which are expanded least, e.g. the neck zone, have a greater wall thickness than the more highly expanded portions. The consequence of this is that the consumption of material is unnecessarily high because of the increased wall thickness.

In order to avoid this unnecessary consumption of material, it is known to arrange for the moulded slugs to be given different wall-thicknesses at the time of extrusion, by adjusting the die size. Moreover, it is known, when heating by infrared radiation, to screen the latter at specific zones of the moulded slug, by the use of suitable masks so as to obtain portions of the slug with different temperatures. This screening by means of masks is an extremely laborious procedure; moreover, the moulded slug must be heated to a certain basic temperature and this means that heat is also radiated on to the screened zones.

It has also been proposed that one should use several infrared radiators having different power consumptions and, therefore, different radiation intensities to accord with the desired differential temperature zones in the moulded slug. In this fashion, good matching of the material temperature to the expansion required can be achieved. However, it has been found that precise temperature adjustment at the surface of the moulded slug requires allowance for a number of variables. These variables are in particular the variation in mains voltage, and the ageing and mutual influencing of the infrared radiators. Moreover, the heating of the walls of the heating chamber and the carriers for the moulded slugs, the heating of the air and the fluctuating output temperatures of the slugs are also variables.

An object of the present invention is to create a method for regulating the wall-thickness of hollow bodies produced from thermoplastic materials by blow-moulding, in which different portions of moulded slugs having uniform wall-thicknesses are heated by means of infrared radiators to different temperatures which, whilst adequate for the blow-moulding operation, are not effected by the variables mentioned above. In particular, it is intended that, by exclusion of the variables, the temperature profile along the axis of the moulded slug, which profile is necessary for the expansion process, shall be produced in a time-stable manner, i.e. shall be the same in respect of all the moulded slugs passing through the heating chamber.

SUMMARY OF THE INVENTION

In accordance with the invention, the radiation intensity of each infrared radiator is measured by a bolometer and the deviation of this measured quantity from a first predetermined guide quantity is used as a correcting quantity to regulate the power consumption of the associated infrared radiator.

Thus, the radiation energy output to the moulded slug, i.e. the fundamental quantity involved in the heating of the slug, is measured and the measurement carried out in a contactless fashion without any heat transfer. Because the temperature of the moulded slug varies as the fourth root of the radiation intensity E, the temperature is rendered particularly stable by regulating the radiation intensity. The bolometers detect both the primary and secondary radiation of the radiators. Through bolometric control of the power consumption of the infrared radiators, the radiation intensity of each radiator is kept constant or varied in accordance with the predetermined guide quantity, so that extraneous influences due to variation in the mains voltage applied to the infrared radiator or due to ageing and mutual influencing of the radiators are excluded. Although each bolometer is assigned to a specific infrared radiator as far as its control function is concerned, the bolometer detects not only the radiation intensity of its associated radiator but also incident residual radiation components from other radiators. Thus, at each point a sum radiation intensity is measured and this is of essential importance in the accurate determination of the radiation intensity distribution along the surface of the moulded slug. Through the control arrangement in accordance with the invention, very high temperature stability can be achieved.

In the preferred embodiment of the invention, the temperature of the moulded slug is also measured pyrometrically and the deviation of this measured quantity from a second predetermined guide quantity is used to control the first guide quantity. Through this temperature measurement and corresponding control of the guide quantity in order to regulate the power consumption of the radiators, all the extraneous thermal effects upon the moulded slugs referred to above are excluded, i.e. those not due to the radiation intensity produced by the infrared radiators, as for example the heating of the heating chamber, the air and the temperature at which the moulded slugs enter the chamber. Through this preferably two-stage control, it is possible to achieve the desired temperature profile of the moulded slug and to maintain it constant over a long period of operation. This kind of control, be it single-stage or two stage, is provided separately for each radiator so that, through the second guide quantity, a temperature which varies from zone to zone can be adjusted in the moulded slug and maintained.

Apparatus for carrying out the method consists essentially of a heating panel, of several rotatable carriers for the slugs, which carriers move through the heating chamber, and of several infrared radiators spaced apart within the chamber in the longitudinal direction thereof and directed on to the different axial zones of the slugs. Each infrared radiator is connected to an internal control circuit which regulates its radiation intensity, said circuit consisting of bolometer, a sum point and a controller, the bolometer being arranged in the field of the radiation from the infrared radiator. As stated hereinbefore, this internal control circuit compensates for the internal variables encountered in operation of the apparatus. In cases where the external variables can be neglected, adequate stability and profiling of the temperature along the axis of the moulded slug can be achieved.

Each inner control circuit is preferably assigned an outer control circuit consisting of a pyrometer, a sum point and a controller, in such fashion that its sum point can be supplied with the desired guide quantity and its controller output connected to the sum point of the inner control circuit, the pyrometer being used to measure the temperature of the slug and arranged in the axial zone corresponding to the infrared radiator. Through the additional connection of the outer control circuit, in addition to the internal variables within the radiators, the external variables are eliminated. Thus, apparatus controlled in this way is particularly independent of external influences.

DESCRIPTION OF THE PREFERRED EMBODIMENTS

Figure 1:
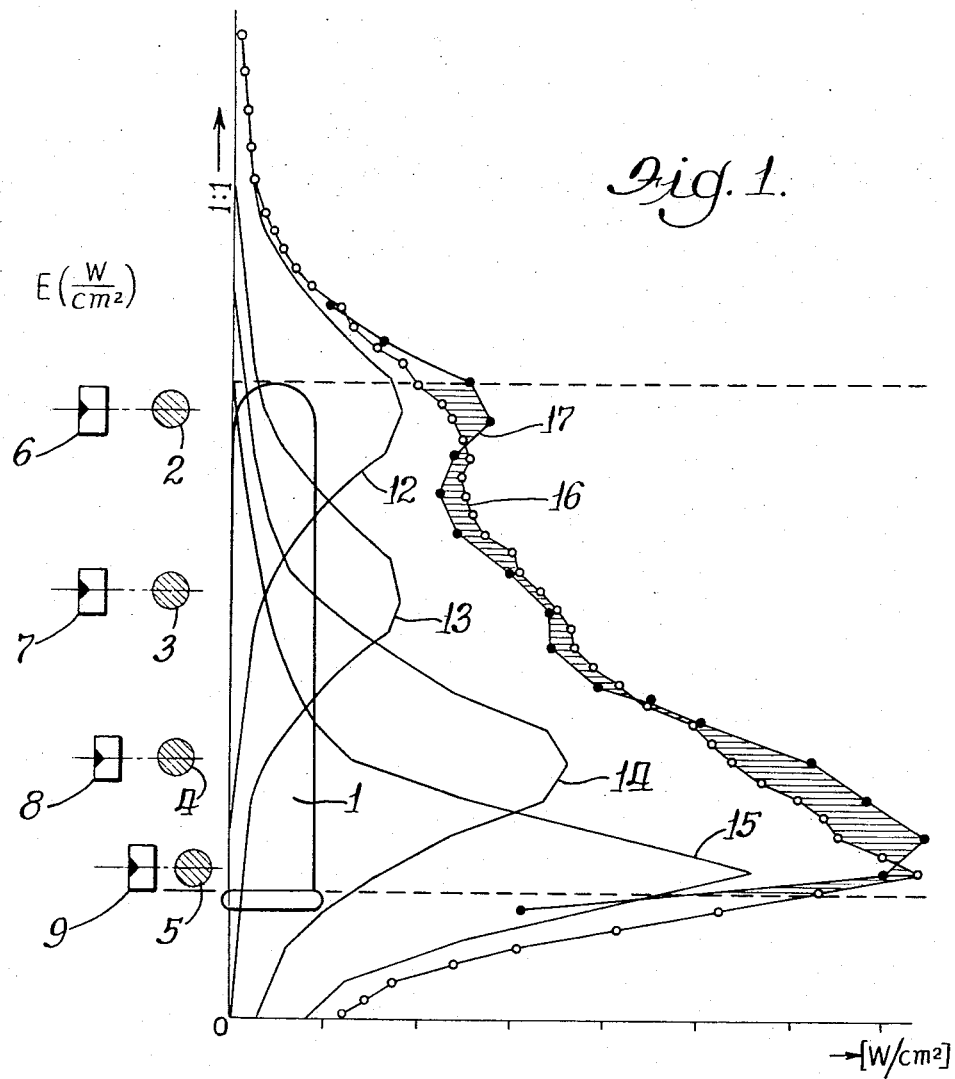
FIG. 1 illustrates the radiation intensity distribution along the axis of a moulded slug when heating the slug with four infrared radiators.

FIG. 1 illustrates a moulded slug 1 in a co-ordinate system whose ordinates plot length and whose abscissae radiation intensity. Laterally of the moulded slug 1, four infrared radiators 2 to 5 are shown, of which the radiators 2 and 3 in each case have a lower power and are situated a greater distance from the slug. The radiators 4 and 5 each have a higher power and are closer to the slug. Reference numberals 6 to 9 indicate the bolometers assigned to the radiators, the spacing of each bolometer from the associated radiator being the same as the spacing of the radiator from the slug. In FIG. 1, the radiation intensities of the individual radiators have been plotted, the curves 12, 13, 14 and 15 indicating the radiation intensities of the radiators 2, 3, 4 and 5 respectively. The curve 16 illustrates the arithmetical summation of these radiator characteristics and 17 is the measured sum curve of the radiation intensity at the moulded slug.

It is clear from FIG. 1 that this sum curve 17 essentially follows the pattern of the curve 16 formed by summation of the radiator characteristics. It is clear, too, that the profile of the sum curve 17 can readily be varied by altering the powers of the individual radiators and/or their spacings from the slug, and that a specific radiation intensity characteristic along the length of the slug 1 can be kept constant if the radiation intensity of each individual radiator is maintained constant by suitable control means. Slugs 1 to be blow-moulded are conveyed through a heating chamber to the blow-moulding die by means of rotatable carriers which move through the chamber past the infrared radiators and control means are provided in per se known manner for controlling the rate of feed of the slugs in accordance with the desired rate of heating and in accordance with the rate at which blow-moulding operations are effected.

Figure 2:
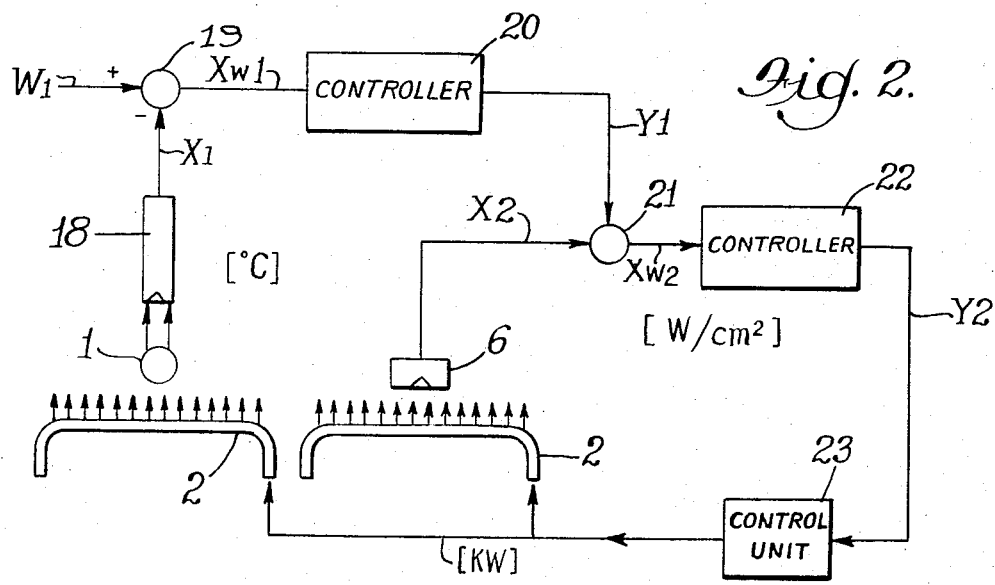
FIG. 2 illustrates the block circuit diagram of the control circuit used to regulate the temperature of a zone of the slug.

FIG. 2 illustrates the block circuit diagram of the preferred temperature control means which includes an inner and an outer control circuit. The inner control circuit consists of the bolometer 6, a sum point 21, and a controller 22, whilst the outer control circuit consists of a pyrometer 18, a sum point 19 and a controller 20. The temperature of the moulded slug 1, heated up by the infrared radiators 2, is measured by the pyrometer 18. From this measured value $X_1$, which is transmitted to the sum point 19, the deviation vis-a-vis a temperature guide quantity $W_1$ is determined, and this deviation produces a signal $X_{W1}$ constituting the input quantity for the controller 20.

The output quantity $Y_1$ of the controller 20, serves as a radiation intensity guide quantity and, together with a signal $X_2$ determined by the bolometer 6 from the radiation intensity of the infrared radiator 2, is supplied to the sum point 21 of the inner control circuit, the input for the controller 22 being the signal $X_{W2}$. The correcting condition $Y_2$ obtained at the output of the controller 22 adjusts a suitable control unit 23 governing the power consumption of the infrared radiators 2 until any disturbing quantity, detected by bolometer 6 and pyrometer 18, has disapeared.

Because each infrared radiator 2 has this kind of control, the temperature characteristics of the moulded slug are determined by a series of temperature guide quantities $W_1$ to $W_N$ which are adjustable independently of one another. The mutual variation of these guide quantities enables an infinitely variable temperature profile to be produced and thus enables optimum matching of the temperature to the desired expansion of the slug during the blow-moulding operation.

What is claimed is:

1. In a method of blow moulding hollow bodies of thermoplastic materials from moulded slugs having various axial zones and of substantially uniform wall thickness wherein the slugs are heated to the requisite blow moulding temperature and expanded to the desired form in a blow moulding die, the improvement of controlling the temperature of the slugs and thereby, the wall thickness of the hollow bodies comprising the steps of:

heating the slugs in each of their various axial zones to different controlled temperatures by a plurality of infra-red radiator means, to allow differential stretching of the hollow bodies at said various axial zones as they are expanded each of said axial zones having a separate radiator means associated therewith;

measuring the radiation intensity of each infra-red radiator means by a bolometer to establish a first measured quantity for each infra-red radiator means;

utilizing any deviation of the first measured quantity for each infra-red radiator means from a first predetermined guide quantity therefor as a correcting quantity to regulate the power consumption of each associated infra-red radiator means;

measuring the temperature of the moulded slugs at each of the different axial zones by pyrometer means to establish a second measured quantity for each axial zone;

utilizing any deviation of the second measured quantity made by said pyrometer means for each axial zone from a second predetermined guide quantity therefor to regulate the first guide quantity for each associated infra-red radiator means.

* * * * *